(12) United States Patent
Sun et al.

(10) Patent No.: US 12,344,722 B2
(45) Date of Patent: Jul. 1, 2025

(54) POLYVINYL CHLORIDE (PVC) FOAMED CEILING PANEL AND FABRICATION METHOD THEREOF

(71) Applicant: BODO PLASTICS CO., LTD., Zibo (CN)

(72) Inventors: Feng Sun, Zibo (CN); Wei Miao, Zibo (CN); Jian Ma, Zibo (CN); Changming Wang, Zibo (CN); Guoqing Yang, Zibo (CN)

(73) Assignee: BODO PLASTICS CO., LTD., Zibo (CN)

( * ) Notice: Subject to any disclaimer, the term of this patent is extended or adjusted under 35 U.S.C. 154(b) by 741 days.

(21) Appl. No.: 17/771,023

(22) PCT Filed: Jul. 22, 2020

(86) PCT No.: PCT/CN2020/103386
§ 371 (c)(1),
(2) Date: Apr. 22, 2022

(87) PCT Pub. No.: WO2021/077823
PCT Pub. Date: Apr. 29, 2021

(65) Prior Publication Data
US 2022/0389182 A1 Dec. 8, 2022

(30) Foreign Application Priority Data
Oct. 26, 2019 (CN) .......................... 201911026654.0

(51) Int. Cl.
*C08J 9/06* (2006.01)
*C08J 9/00* (2006.01)
(Continued)

(52) U.S. Cl.
CPC .......... *C08J 9/0095* (2013.01); *C08J 9/0066* (2013.01); *C08J 9/08* (2013.01); *C08J 9/103* (2013.01);
(Continued)

(58) Field of Classification Search
CPC . C08J 9/0095; C08J 9/0066; C08J 9/08; C08J 9/103; C08J 2203/02; C08J 2203/04;
(Continued)

(56) References Cited

U.S. PATENT DOCUMENTS

2011/0207839 A1    8/2011   Bussels et al.

FOREIGN PATENT DOCUMENTS

CN    102464841    *  5/2012
CN    108485107 A     9/2018
(Continued)

*Primary Examiner* — K. Boyle
(74) *Attorney, Agent, or Firm* — Bayramoglu Law Offices LLC

(57) ABSTRACT

A polyvinyl chloride (PVC) foamed ceiling panel and a fabrication method thereof are disclosed. The PVC foamed ceiling panel is made of a PVC resin powder, a filler, a foaming regulator, a composite foaming agent, a calcium-zinc stabilizer, a lubricant, a pigment, a weather resistance modifier, a smoke suppressant, and a flame retardant. The PVC foamed ceiling panel has the advantages of heat resistance, matting, smoke suppression, flame retardancy, environmental friendliness, light weight, small thickness, safety, long-term action, long service life, wide use range, and the like, and can be used for suspended ceilings in residential buildings, office buildings, exhibition halls, conference halls, and the like and for various decorations. The fabrication method of the PVC foamed ceiling panel has the advantages of low cost, high performance, scientific rationality, and simple and easy operation.

10 Claims, 1 Drawing Sheet

(51) Int. Cl.
    *C08J 9/08*          (2006.01)
    *C08J 9/10*          (2006.01)
    *C08L 27/06*        (2006.01)

(52) U.S. Cl.
    CPC ........... C08L 27/06 (2013.01); *C08J 2203/02* (2013.01); *C08J 2203/04* (2013.01); *C08J 2327/06* (2013.01); *C08L 2201/02* (2013.01); *C08L 2203/14* (2013.01)

(58) Field of Classification Search
    CPC .. C08J 2327/06; C08J 2201/03; C08J 9/0061; C08J 9/102; C08J 9/107; C08J 2427/06; C08L 27/06; C08L 2201/02; C08L 2203/14; C08L 2205/025; C08L 2205/03; C08L 33/12; B29K 2027/06; B29L 2007/002; B29C 44/3442; B29C 44/505; C08K 5/23; C08K 2003/262; C08K 13/02
    See application file for complete search history.

(56)           References Cited

FOREIGN PATENT DOCUMENTS

| | | | | |
|---|---|---|---|---|
| CN | 108641216 A | * | 10/2018 | ............ C08J 9/0061 |
| CN | 109535309 A | | 3/2019 | |
| CN | 109535609 A | * | 3/2019 | ................ C08J 9/08 |
| CN | 109591419 A | * | 4/2019 | ........... B32B 27/065 |
| CN | 110607044 A | | 12/2019 | |

* cited by examiner

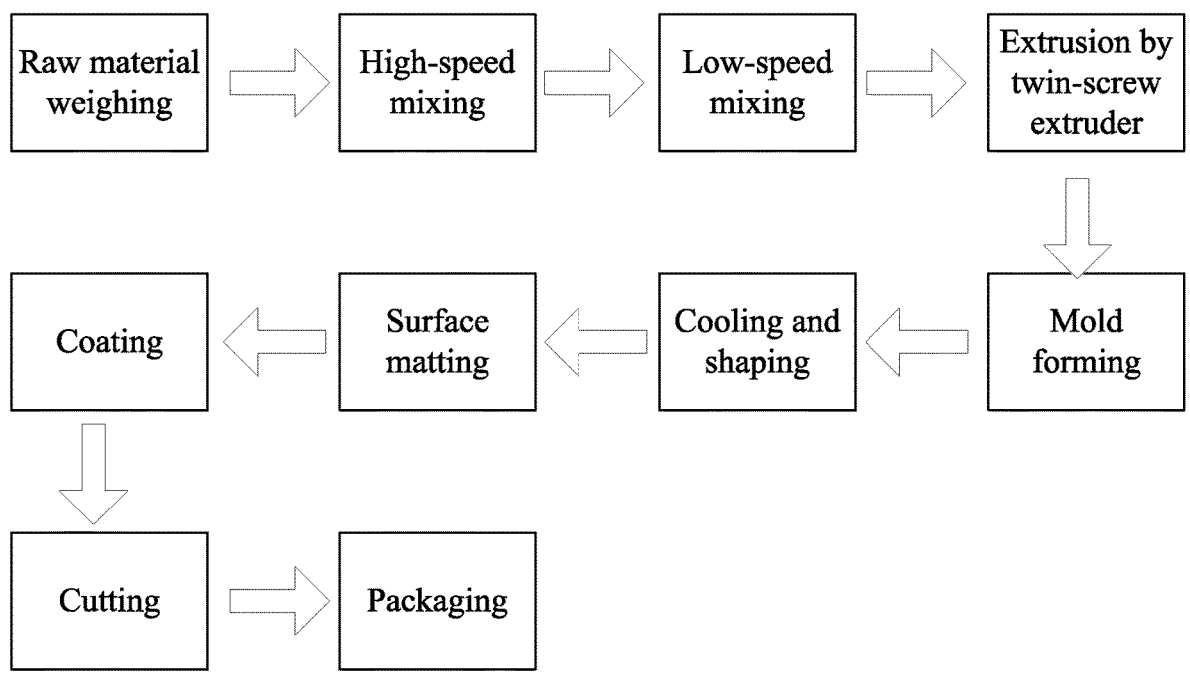

POLYVINYL CHLORIDE (PVC) FOAMED CEILING PANEL AND FABRICATION METHOD THEREOF

CROSS REFERENCE TO THE RELATED APPLICATIONS

This application is the national phase entry of International Application No. PCT/CN2020/103386, filed on Jul. 22, 2020, which is based upon and claims priority to Chinese Patent Application No. 201911026654.0, filed on Oct. 26, 2019, the entire contents of which are incorporated herein by reference.

TECHNICAL FIELD

The present disclosure belongs to the technical field of polyvinyl chloride (PVC) ceiling panels, and particularly relates to a PVC ceiling panel and a fabrication method thereof.

BACKGROUND

Ceiling panels are a group of suspended ceiling materials, and have the functions of heat preservation, heat insulation, sound insulation, and sound absorption. The ceiling panels can also serve as hidden layers in electrical engineering, ventilation and air conditioning, communication and fire protection, alarm pipeline equipment, and the like. At present, common ceiling panels include mineral wool panels, calcium silicate panels, aluminum gussets, and PVC panels.

PVC foamed panels are light and strong, and are the most commonly used building materials. However, most of the ceiling panels in the prior art have a hollow dense structure that is not foamed, and these ceiling panels cannot enter the high-end market of building materials due to low cost, simple and extensive product structure, easy visual fatigue caused by an unstable optical effect, and the like. In addition, these materials often suffer from sagging, deformation, cracking, and yellowing when heated, and produce a large amount of black smoke or even burn after catching fire, which shortens their service lives and seriously affects their application and promotion.

SUMMARY

The technical problem to be solved by the present disclosure: In order to overcome the deficiencies of the prior art, the present disclosure provides a PVC foamed ceiling panel, which has the properties of heat resistance, high weather resistance, matte, flame retardancy, and smoke suppression, is thin and light-weight, and shows prominent mechanical properties; and the present disclosure also provides a fabrication method of the PVC foamed ceiling panel, which is scientific, reasonable, simple, and easy to operate.

The PVC foamed ceiling panel of the present disclosure is fabricated from the following raw materials in parts by weight:

| | |
|---|---|
| PVC resin powder | 100 parts |
| filler | 10 to 40 parts |
| foaming regulator | 7 to 14 parts |
| composite foaming agent | 1 to 2 parts |
| calcium-zinc stabilizer | 3 to 5 parts |
| lubricant | 1 to 2 parts |
| weather resistance modifier | 2 to 8 parts |
| smoke suppressant | 1 to 20 parts |
| flame retardant | 10 to 60 parts |
| pigment | 0.01 to 0.1 part. |

The PVC resin powder may be a composite of a PVC resin powder SG-5 and a PVC resin powder SG-8; the PVC resin powder SG-5 may be a powder with an average degree of polymerization (DP) of 981 to 1,135, the PVC resin powder SG-8 may be a powder with an average DP of 650 to 740, and a mass ratio of the SG-5 to the SG-8 may be 1:1 to 1:3; the filler may be ground calcium carbonate (GCC) with a particle size of 800 mesh to 2,500 mesh; and the foaming regulator may be a high-viscosity methacrylate polymer with an intrinsic viscosity (IV) of 13 η to 15 η.

The composite foaming agent may be a compound of a yellow foaming agent and a white foaming agent; the yellow foaming agent may be one selected from the group consisting of diisopropyl azodicarboxylate (DIAD) and nitroso foaming agents, and the white foaming agent may be one selected from the group consisting of ammonium bicarbonate and sodium bicarbonate; and the yellow foaming agent and the white foaming agent may be compounded in a mass ratio of 1:1 to 1:3.

The calcium-zinc stabilizer may be a calcium-zinc composite thermal stabilizer synthesized from calcium stearate, zinc stearate, and hydrotalcite; the lubricant may be one or more selected from the group consisting of stearic acid, oxidized polyethylene (OPE) wax, polyethylene (PE) wax, and calcium stearate; and the pigment may be one or two selected from the group consisting of optical brightener (OB) and lightfast ultramarine.

The weather resistance modifier may be rutile titanium dioxide.

Preferably, a mass of the smoke suppressant may be 2% to 10% of a total mass of the raw materials; and the smoke suppressant may be a composite of ammonium octamolybdate (AOM) and a metal oxide, and the metal oxide may include zinc oxide and magnesium oxide, where the AOM may account for 80%, and the zinc oxide and magnesium oxide may each account for 10%.

The flame retardant may include a boron-based flame retardant, a silicon-based flame retardant, and a metal compound, where the boron-based flame retardant may account for 20% to 30% in mass, the silicon-based flame retardant may account for 40% to 60% in mass, and the metal compound may account for 10% to 30% in mass.

The fabrication method of the PVC foamed ceiling panel of the present disclosure includes the following steps:

(1) automatically measuring the PVC resin powder, the filler, the foaming regulator, the composite foaming agent, the calcium-zinc stabilizer, the lubricant, the weather resistance modifier, the smoke suppressant, the flame retardant, and the pigment by a full-automatic batching system, adding measured materials to a high-speed mixer and heating to 100° C. to 120° C., transferring the materials to a cold mixer for cooling, and when the materials are cooled to 40° C. or lower, placing the materials into a storage bin to obtain a mixed material;

(2) allowing the mixed material obtained in step (1) to be sucked into a hopper of a twin-screw extruder of a main machine through a vacuum feeder, melted and plasticized by the twin-screw extruder, transferred into a mold through a confluence core, foamed in the mold, and then extruded through a die lip; and (3) cooling and shaping through a shaping plate, matting by a high-temperature matting roller, trimming by a trimming device, coating by a coating device, drawing by a drawing machine, and automatically measuring and cutting to obtain a finished PVC ceiling panel.

Specific process parameters in step (2) may be set as follows: a rotational speed of the main machine: 9 rpm/min to 13 rpm/min; a current of the main machine: 95 A to 135 A; a temperature of a screw cylinder: 155° C. to 170° C.; a temperature of the confluence core: 140° C. to 165° C.; and an oil temperature of the die lip: 160° C. to 180° C.

Four sets of shaping plates may be preferably used in step (3), each set may include upper and lower two shaping plates, and low-temperature circulating water at 15° C. to 25° C. may be introduced into each shaping plate to make the shaping plate in a low-temperature state. The high-temperature matting roller may be an auxiliary device, and a temperature thereof may be controlled by circulating heat-conducting oil at 90° C. to 120° C.

Compared with the prior art, the present disclosure has the following beneficial effects:

The PVC foamed ceiling panel of the present disclosure has the advantages of environmental friendliness, heat resistance, matting, light weight, small thickness, sound insulation and noise reduction, safety, long-term action, water resistance, vermin resistance, no heavy metal pollution, smoke suppression, flame retardancy, any cutting process availability, long service life, and the like, and can be used for suspended ceiling in residential buildings, office buildings, exhibition halls, conference halls, and the like and for various decorations. The present disclosure also provides a fabrication method of the PVC foamed ceiling panel, which has the advantages of low cost, high performance, scientific rationality, and simple and easy operations.

BRIEF DESCRIPTION OF THE DRAWINGS

FIG. 1 is a flow chart of the fabrication of a PVC foamed ceiling panel according to an embodiment of the present disclosure.

DETAILED DESCRIPTION OF THE EMBODIMENTS

The present disclosure is further described below with reference to accompanying drawings and examples.

Example 1

A PVC foamed ceiling panel was fabricated from the following raw materials in parts by weight:

| PVC (SG-8) | 75 parts |
| PVC (SG-5) | 25 parts |
| filler | 40 parts |
| flame retardant | 10 parts |
| smoke suppressant | 5 parts |
| foaming regulator | 8.5 parts |
| composite foaming agent | 0.5 part |
| calcium-zinc stabilizer | 2.5 parts |
| lubricant | 0.5 part |
| pigment | 0.04 part |
| weather resistance modifier | 3 parts. |

The PVC resin powder was a composite of a PVC resin powder SG-5 and a PVC resin powder SG-8; and the PVC resin powder SG-5 was a powder with an average DP of 1,000, the PVC resin powder SG-8 was a powder with an average DP of 700, and a mass ratio of SG-8 to SG-5 was to 3:1.

The filler was GCC with a particle size of 900 mesh.

The flame retardant included a boron-based flame retardant, a silicon-based flame retardant, and a metal compound, where the boron-based flame retardant accounted for 30%, the silicon-based flame retardant accounted for 50%, and the metal compound accounted for 20%.

The smoke suppressant was a composite of AOM and a metal oxide, and the metal oxide included zinc oxide and magnesium oxide, where the AOM accounted for 80%, and the zinc oxide and magnesium oxide each accounted for 10%.

The calcium-zinc stabilizer was a calcium-zinc composite thermal stabilizer synthesized from calcium stearate and zinc stearate.

The pigment was a mixture of OB and ultramarine.

The foaming regulator was a methacrylate polymer with an IV of 14 η.

The composite foaming agent was a compound of a yellow foaming agent and a white foaming agent; and the yellow foaming agent was a DIAD foaming agent, the white foaming agent was a sodium bicarbonate foaming agent, and the yellow foaming agent and the white foaming agent were compounded in a mass ratio of 1:3.

The lubricant was a mixture of stearic acid, OPE wax, and PE wax.

A fabrication method was as follows:
(1) the materials in the formula were automatically measured by a full-automatic batching system, added to a high-speed mixer and heated to 110° C., and then transferred to a cold mixer and cooled, and when cooled to 40° C. or lower, the materials were placed into a storage bin to obtain a mixed material for later use;
(2) extrusion: the mixed material obtained in step (1) was sucked into a hopper of a conical twin-screw extruder of a main machine through a vacuum feeder, melted and plasticized by the extruder, transferred into a mold, extruded through a die lip, and then transferred into a shaping plate for cooling and shaping;
(3) matting: a panel obtained after the shaping was matted by a matting device, and a matting result was determined by a value of gloss unit (GU) (60° C.) and a value of an optical Y coordinate; and
(4) forming: the panel was drawn by a drawing machine, trimmed by a trimming device, and automatically measured and cut to obtain a PVC ceiling panel product.

Specific process parameters in step (2) were set as follows: a rotational speed of the main machine: 10.5 rpm/min; a current of the main machine: 130 A; a temperature of a screw cylinder: 170° C.; a temperature of a die: 175° C.; and an oil temperature of the die lip: 175° C. 4 sets of shaping plates were used, and circulating water at 20° C. was introduced into each shaping plate to keep the shaping plate at a low temperature.

In step (3), a temperature of each of the upper and lower heating rollers of the matting device was set to 110° C., and a gap between the matting rollers was set to 4.5 mm; and the value of GU (60°) and the value of the optical Y coordinate were determined by a GU meter and a spectrophotometer, respectively.

The PVC ceiling panel product obtained by the fabrication method was a ceiling panel I with a specification of 5 mm*0.50 g/mm$^3$.

Example 2

A PVC foamed ceiling panel was fabricated from the following raw materials in parts by weight:

| | |
|---|---|
| PVC (SG-8) | 75 parts |
| PVC (SG-5) | 25 parts |
| filler | 20 parts |
| flame retardant | 30 parts |
| smoke suppressant | 10 parts |
| foaming regulator | 12 parts |
| composite foaming agent | 1.7 parts |
| calcium-zinc stabilizer | 3.0 parts |
| lubricant | 1.8 parts |
| pigment | 0.04 part |
| weather resistance modifier | 5 parts. |

The PVC resin powder was a composite of a PVC resin powder SG-5 and a PVC resin powder SG-8; and the PVC resin powder SG-5 was a powder with an average DP of 1,000, the PVC resin powder SG-8 was a powder with an average DP of 700, and a mass ratio of SG-8 to SG-5 was to 3:1.

The filler was GCC with a particle size of 900 mesh.

The flame retardant included a boron-based flame retardant, a silicon-based flame retardant, and a metal compound, where the boron-based flame retardant accounted for 30%, the silicon-based flame retardant accounted for 50%, and the metal compound accounted for 20%.

The smoke suppressant was a composite of AOM and a metal oxide, and the metal oxide included zinc oxide and magnesium oxide, where the AOM accounted for 80%, and the zinc oxide and magnesium oxide each accounted for 10%.

The calcium-zinc stabilizer was a calcium-zinc composite thermal stabilizer synthesized from calcium stearate and zinc stearate.

The pigment was a mixture of OB and ultramarine.

The foaming regulator was a methacrylate polymer with an IV of 14 η.

The composite foaming agent was a compound of a yellow foaming agent and a white foaming agent; and the yellow foaming agent was a DIAD foaming agent, the white foaming agent was a sodium bicarbonate foaming agent, and the yellow foaming agent and the white foaming agent were compounded in a mass ratio of 1:3.

The lubricant was a mixture of stearic acid, OPE wax, and PE wax.

A fabrication method was as follows:
(1) the materials in the formula were automatically measured by a full-automatic batching system, added to a high-speed mixer and heated to 110° C., and then transferred to a cold mixer and cooled, and when cooled to 40° C. or lower, the materials were placed into a storage bin to obtain a mixed material for later use;
(2) extrusion: the mixed material obtained in step (1) was sucked into a hopper of a conical twin-screw extruder of a main machine through a vacuum feeder, melted and plasticized by the extruder, transferred into a mold, extruded through a die lip, and then transferred into a shaping plate for cooling and shaping;
(3) matting: a panel obtained after the shaping was matted by a matting device, and a matting result was determined by a value of GU (60° C.) and a value of an optical Y coordinate; and
(4) forming: the panel was drawn by a drawing machine, trimmed by a trimming device, and automatically measured and cut to obtain a PVC ceiling panel product.

Specific process parameters in step (2) were set as follows: a rotational speed of the main machine: 10.5 rpm/min; a current of the main machine: 130 A; a temperature of a screw cylinder: 165° C.; a temperature of a die: 175° C.; and an oil temperature of the die lip: 175° C. 4 sets of shaping plates were used, and circulating water at 20° C. was introduced into each shaping plate to keep the shaping plate at a low temperature.

In step (3), a temperature of each of the upper and lower heating rollers of the matting device was set to 110° C., and a gap between the matting rollers was set to 4.5 mm; and the value of GU (60°) and the value of the optical Y coordinate were determined by a GU meter and a spectrophotometer, respectively.

The PVC ceiling panel product obtained by the fabrication method was a ceiling panel I with a specification of 5 mm*0.50 g/mm$^3$.

Example 3

A PVC foamed ceiling panel was fabricated from the following raw materials in parts by weight:

| | |
|---|---|
| PVC (SG-8) | 75 parts |
| PVC (SG-5) | 25 parts |
| filler | 10 parts |
| flame retardant | 60 parts |
| smoke suppressant | 15 parts |
| foaming regulator | 14 parts |
| composite foaming agent | 2.0 parts |
| calcium-zinc stabilizer | 4.0 parts |
| lubricant | 2.0 parts |
| pigment | 0.04 part |
| weather resistance modifier | 8 parts. |

The PVC resin powder was a composite of a PVC resin powder SG-5 and a PVC resin powder SG-8; and the PVC resin powder SG-5 was a powder with an average DP of 1,000, the PVC resin powder SG-8 was a powder with an average DP of 700, and a mass ratio of SG-8 to SG-5 was to 3:1.

The filler was GCC with a particle size of 900 mesh.

The flame retardant included a boron-based flame retardant, a silicon-based flame retardant, and a metal compound, where the boron-based flame retardant accounted for 30%, the silicon-based flame retardant accounted for 50%, and the metal compound accounted for 20%.

The smoke suppressant was a composite of AOM and a metal oxide, and the metal oxide included zinc oxide and magnesium oxide, where the AOM accounted for 80%, and the zinc oxide and magnesium oxide each accounted for 10%.

The calcium-zinc stabilizer was a calcium-zinc composite thermal stabilizer synthesized from calcium stearate and zinc stearate.

The pigment was a mixture of OB and ultramarine.

The foaming regulator was a methacrylate polymer with an IV of 14 r.

The composite foaming agent was a compound of a yellow foaming agent and a white foaming agent; and the yellow foaming agent was a DIAD foaming agent, the white foaming agent was a sodium bicarbonate foaming agent, and the yellow foaming agent and the white foaming agent were compounded in a mass ratio of 1:3.

The lubricant was a mixture of stearic acid, OPE wax, and PE wax.

A fabrication method was as follows:
(1) the materials in the formula were automatically measured by a full-automatic batching system, added to a high-speed mixer and heated to 110° C., and then transferred to a cold mixer and cooled, and when cooled to 40° C. or lower, the materials were placed into a storage bin to obtain a mixed material for later use;
(2) extrusion: the mixed material obtained in step (1) was sucked into a hopper of a conical twin-screw extruder of a main machine through a vacuum feeder, melted and plasticized by the extruder, transferred into a mold, extruded through a die lip, and then transferred into a shaping plate for cooling and shaping;
(3) matting: a panel obtained after the shaping was matted by a matting device, and a matting result was determined by a value of GU (60° C.) and a value of an optical Y coordinate; and
(4) forming: the panel was drawn by a drawing machine, trimmed by a trimming device, and automatically measured and cut to obtain a PVC ceiling panel product.

Specific process parameters in step (2) were set as follows: a rotational speed of the main machine: 10.5 rpm/min; a current of the main machine: 130 A; a temperature of a screw cylinder: 165° C.; a temperature of a die: 175° C.; and an oil temperature of the die lip: 175° C. 4 sets of shaping plates were used, and circulating water at 20° C. was introduced into each shaping plate to keep the shaping plate at a low temperature.

In step (3), a temperature of each of the upper and lower heating rollers of the matting device was set to 110° C., and a gap between the matting rollers was set to 4.5 mm; and the value of GU (60°) and the value of the optical Y coordinate were determined by a GU meter and a spectrophotometer, respectively.

The PVC ceiling panel product obtained by the fabrication method was a ceiling panel I with a specification of 5 mm*0.50 g/mm$^3$.

Comparative Example 1

A commercially-available 5 mm (0.5) PVC ceiling panel of a popular brand was adopted as a comparative example.
Examples 1 to 3 and Comparative Example 1 were each subjected to a performance test, and test data were shown in Table 1.

Certainly, the above-mentioned examples are merely preferred examples of the present disclosure and are not to be construed as limiting the scope of the examples of the present disclosure. The present disclosure is not limited to the above-mentioned examples, and equivalent changes, modifications, and the like made by those of ordinary skill in the art within the essential scope of the present disclosure should all fall within the scope covered by the patent of the present disclosure.

What is claimed is:

1. A polyvinyl chloride (PVC) foamed ceiling panel, fabricated from the following raw materials in parts by weight:
   100 parts of a PVC resin powder,
   10 to 40 parts of a filler,
   7 to 14 parts of a foaming regulator,
   1 to 2 parts of a composite foaming agent,
   3 to 5 parts of a calcium-zinc stabilizer,
   1 to 2 parts of a lubricant,
   2 to 8 parts of a weather resistance modifier,
   1 to 20 parts of a smoke suppressant,
   10 to 60 parts of aflame retardant,
   0.01 to 0.1 parts of a pigment.

2. The PVC foamed ceiling panel according to claim 1, wherein
   the PVC resin powder is a composite of a PVC resin powder SG-5 and a PVC resin powder SG-8, wherein the PVC resin powder SG-5 is a powder with an average degree of polymerization (DP) of 981 to 1,135, the PVC resin powder SG-8 is a powder with an average DP of 650 to 740, and a mass ratio of the SG-5 to the SG-8 is 1:1 to 1:3;
   the filler is ground calcium carbonate (GCC) with a particle size of 800 mesh to 2,500 mesh; and
   the foaming regulator is a high-viscosity methacrylate polymer with an intrinsic viscosity (IV) of 13 η to 15 η.

3. The PVC foamed ceiling panel according to claim 1, wherein
   the composite foaming agent is a compound of a yellow foaming agent and a white foaming agent;
   the yellow foaming agent is one selected from the group consisting of diisopropyl azodicarboxylate (DIAD) and nitroso foaming agents, and the white foaming agent is one selected from the group consisting of ammonium bicarbonate and sodium bicarbonate; and

TABLE 1

| Test item | | Example 1 | Example 2 | Example 3 | Comparative Example 1 |
|---|---|---|---|---|---|
| Diagonal deviation (mm) | | 1 | 1 | 1 | 2 |
| Warpage (mm/m) | | 0.5 | 0.5 | 0.5 | 1.0 |
| Hardness (D) | | 43 | 38 | 36 | 32 |
| Thermal deformation temperature (° C.) | | 73 | 72 | 72 | 68 |
| Sag (55° C. * 7 d/mm) | | 1 | 2 | 1 | 6 |
| Flexural Strength (MPa) | | 13.5 | 13.8 | 12.8 | 9.2 |
| Lead content (mg/kg) | | No lead is detected | No lead is detected | No lead is detected | 1300 |
| Light reflectance | Y value | 90.8 | 91.2 | 91.4 | 93.8 |
|  | GU (60°) | 4.6 | 4.8 | 4.5 | 8.2 |
| Aging resistance, 1200 h (ΔE) | | 2.0 | 1.8 | 1.5 | 3.5 |
| Flame retardancy and smoke suppression (ASTME84) | FSI | 47.3 | 23.5 | 14.6 | 109 |
|  | SDI | 396 | 282 | 222 | 468 |
|  | Grade | B | A | A | Unqualified | the yellow foaming agent and the white foaming agent are compounded in a mass ratio of 1:1 to 1:3.

4. The PVC foamed ceiling panel according to claim 1, wherein
the calcium-zinc stabilizer is a calcium-zinc composite thermal stabilizer synthesized from calcium stearate, zinc stearate, and hydrotalcite;
the lubricant is at least one selected from the group consisting of stearic acid, oxidized polyethylene (OPE) wax, polyethylene (PE) wax, and calcium stearate; and
the pigment is at least one selected from the group consisting of an optical brightener (OB) and lightfast ultramarine.

5. The PVC foamed ceiling panel according to claim 1, wherein the weather resistance modifier is rutile titanium dioxide.

6. The PVC foamed ceiling panel according to claim 1, wherein
a mass of the smoke suppressant is 2% to 10% of a total mass of the raw materials; and
the smoke suppressant is a composite of ammonium octamolybdate (AOM) and a metal oxide,
wherein the metal oxide comprises zinc oxide and magnesium oxide,
wherein in the smoke suppressant, the AOM accounts for 80 wt %, and the zinc oxide and magnesium oxide each account for 10 wt %.

7. The PVC foamed ceiling panel according to claim 1,
wherein the flame retardant comprises a boron-based flame retardant, a silicon-based flame retardant, and a metal compound,
wherein in the flame retardant, the boron-based flame retardant accounts for 20% to 30% in mass, the silicon-based flame retardant accounts for 40% to 60% in mass, and the metal compound accounts for 10% to 30% in mass.

8. A fabrication method of the PVC foamed ceiling panel according to claim 1, comprising the following steps:
1) automatically measuring the PVC resin powder, the filler, the foaming regulator, the composite foaming agent, the calcium-zinc stabilizer, the lubricant, the weather resistance modifier, the smoke suppressant, the flame retardant, and the pigment by a full-automatic batching system to obtain measured materials, adding the measured materials to a high-speed mixer and heating to 100° C. to 120° C. to obtain heated materials, transferring the heated materials to a cold mixer for cooling, and when the materials are cooled to 40° C. or lower, placing the materials into a storage bin to obtain a mixed material;

2) allowing the mixed material obtained in step 1 to be sucked into a hopper of a twin-screw extruder through a vacuum feeder, melted and plasticized by the twin-screw extruder, transferred into a mold through a confluence core, foamed in the mold, and then extruded through a die lip to obtain an extruded material, wherein the twin-screw extruder is a main machine; and 3) cooling and shaping the extruded material through a shaping plate to obtain a panel, and performing matting by a high-temperature matting roller, trimming by a trimming device, coating by a coating device, drawing by a drawing machine, and automatically measuring and cutting to the panel to obtain a finished product of the PVC foamed ceiling panel.

9. The fabrication method of the PVC foamed ceiling panel according to claim 8, wherein specific process parameters in step 2 are set as follows: a rotational speed of the main machine: 9 rpm/min to 13 rpm/min; a current of the main machine: 95 A to 135 A; a temperature of a screw cylinder: 155° C. to 170° C.; a temperature of the confluence core: 140° C. to 165° C.; and an oil temperature of the die lip: 160° C. to 180° C.

10. The fabrication method of the PVC foamed ceiling panel according to claim 8, wherein in step 3, a temperature of the high-temperature matting roller is 90° C. to 120° C., and a cooling medium of the shaping plate is circulating water at 15° C. to 25° C.

\* \* \* \* \*